(12) United States Patent
Roth et al.

(10) Patent No.: US 6,728,870 B1
(45) Date of Patent: Apr. 27, 2004

(54) REGISTER MOVE OPERATIONS

(75) Inventors: Charles P. Roth, Austin, TX (US);
Ravi P. Singh, Austin, TX (US);
Gregory A. Overkamp, Austin, TX (US); Ryo Inoue, Austin, TX (US)

(73) Assignees: Intel Corporation, Santa Clara, CA (US); Analog Devices, Inc., Norwood, CA (US)

( * ) Notice: Subject to any disclaimer, the term of this patent is extended or adjusted under 35 U.S.C. 154(b) by 604 days.

(21) Appl. No.: 09/680,894

(22) Filed: Oct. 6, 2000

(51) Int. Cl.[7] .............................................. G06F 9/315
(52) U.S. Cl. ........................ 712/225; 712/216; 712/226; 712/234
(58) Field of Search ................................. 712/216, 225, 712/226, 234

(56) References Cited

U.S. PATENT DOCUMENTS

| | | |
|---|---|---|
| 5,509,129 A | 4/1996 | Guttag et al. |
| 5,636,353 A | 6/1997 | Ikenaga et al. |
| 5,889,984 A | 3/1999 | Mills |
| 5,923,883 A * | 7/1999 | Tanaka et al. ............... 717/156 |
| 6,009,512 A * | 12/1999 | Christie ....................... 712/226 |

OTHER PUBLICATIONS

Mahlke et al., "A Comparison of Full and Partial Predicated Execution Support for ILP Processors", Proceedings of the 22nd Annual International Symposium on Computer Architecture, ACM, 1995, pp. 138–150.*

Makoto Ikeda et al. "Data Bypassing Register Fule for Low Power Microprocessor" IEICE Transactions on Electronics, Institute of Electronics Information and Comm. Eng. Oct. 1, 1995, vol. E78–C, No. 10, pp. 1470–1472.

* cited by examiner

*Primary Examiner*—William M. Treat
(74) *Attorney, Agent, or Firm*—Fish & Richardson P.C.

(57) ABSTRACT

In one embodiment, a programmable processor is adapted to conditionally move data between a pointer register and a data register in response to a single machine instruction. The processor has a plurality of pipelines. In response to the machine instruction, a control unit directs the pipelines to forward the data across the pipelines in order to move the data between the registers.

37 Claims, 4 Drawing Sheets

REGISTER MOVE OPERATIONS

BACKGROUND

This invention relates to register move operations for a computer.

Many conventional programmable processors, such as digital signal processors (DSP), include a variety of internal registers for use when processing data. One type of register, referred to as a data register, is primarily used to store the results of a current operation and to supply the results to subsequent operations. The data registers are often grouped into a set of registers referred to as a register file.

A second type of register is a pointer register that is typically used to store an address. Unlike the data stored by the data registers, which is often provided directly to an execution unit within the processor, the addresses stored by the pointer registers are primarily used to retrieve data from a memory system. A group of pointer registers often includes a stack pointer, a frame pointer and a number of general-purpose pointer registers.

DESCRIPTION

Figure 1:
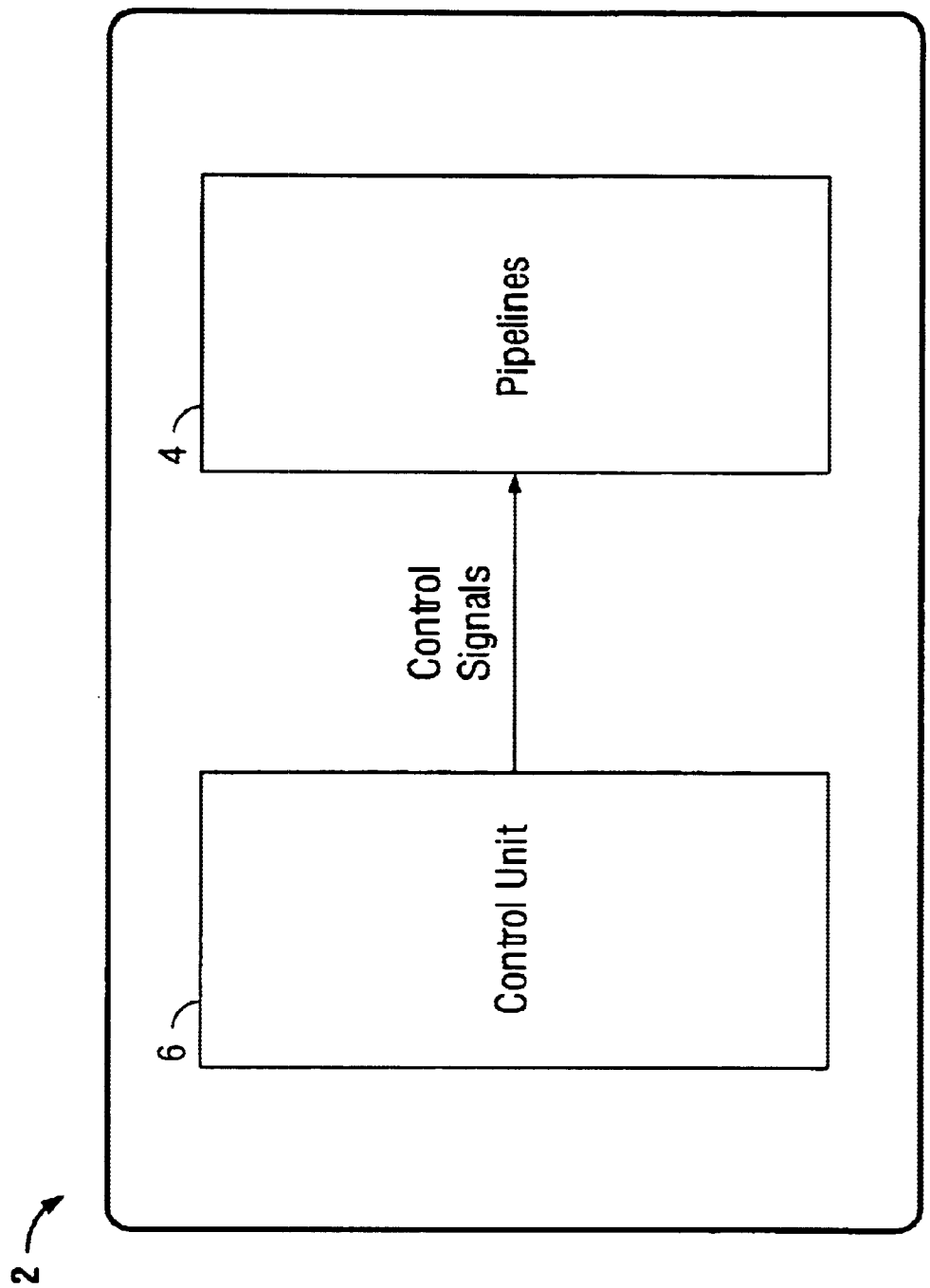
FIG. 1 is a block diagram illustrating an example of a pipelined programmable processor according to the invention.

FIG. 1 is a block diagram illustrating a programmable processor 2 having one or more pipelines 4 and a control unit 6. Processor 2, as explained in detail below, supports machine instructions for moving data between a pointer register and a data register. In particular, processor 2 supports a machine instruction, referred to herein as the CC MOVE instruction, which moves data between a pointer register and a data register.

Pipelines 4 include a number of hardware pipelines having a number of stages for processing instructions. The stages may process concurrently with the other stages and forward results to the next stage in accordance with a clock cycle. The results of the instructions emerges at the end pipelines 4 in rapid succession.

Control unit 6 may control the flow of instructions and data through the various stages of pipelines 4. During the processing of an instruction, for example, control unit 6 may direct the various components of the pipelines to fetch and decode an instruction, perform the corresponding operation and write the results back to memory or local registers.

Figure 2:
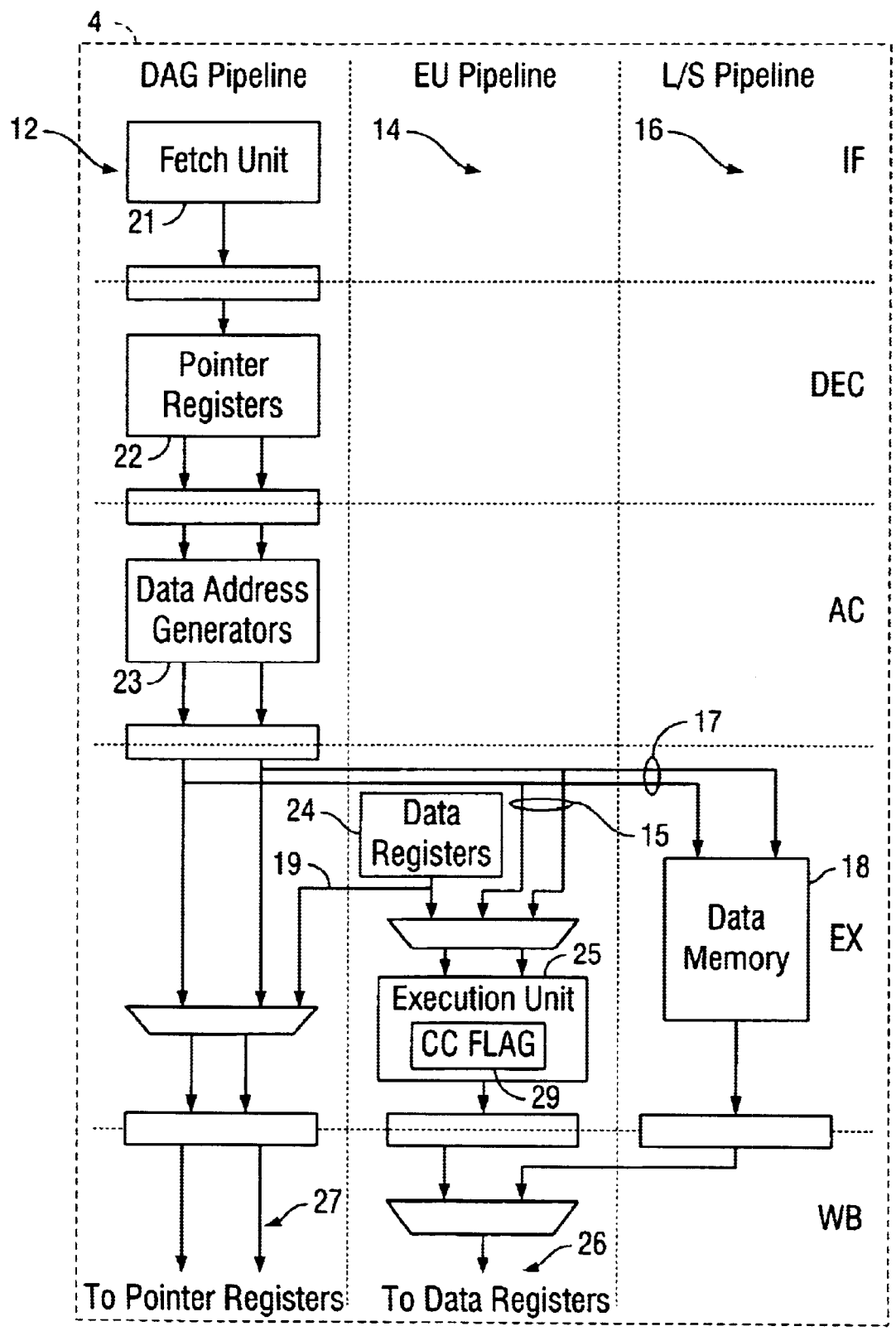
FIG. 2 is a block diagram illustrating example pipelines for the programmable processor.

Figure 2 illustrates an example of a pipelined processor having a data address generation (DAG) pipeline 12, an execution unit (EU) pipeline 14 and a load/store (L/S) pipeline 16 arranged according to one embodiment of the invention. Each pipeline has, for example, five stages: instruction fetch (IF), decode (DEC), address calculation and data fetch (AC), execute (EX) and write back (WB).

Within DAG pipeline 12, instructions are fetched from memory, or from an instruction cache, during the IF stage by fetch unit 21 and decoded during the DEC stage. In addition, the DEC stage of DAG pipeline 12 may include a set of pointer registers 22 for storing memory addresses. At the next clock cycle, the decoded instructions, and any pointer addresses used by the instruction, may be passed to the AC stage via DAG pipeline 12 to data address generator (DAG) 23. DAG 23 may calculate any additional memory addresses that are necessary to perform the operation. These addresses may propagate down DAG pipeline 12 to be written back to a pointer register 22. Alternatively, the instructions may pass to EU pipeline 14 via path 15 for use by execution unit 25 or pass to L/S pipeline 16 via path 17 for loading data from memory 18. In one embodiment, DAG 23 may include circular buffer addressing registers used as pointer registers, such as index, base and length registers.

During the EX stage, execution unit 25 may perform the specified operation such as, for example, adding or multiplying two numbers. Execution unit 25 may comprise specialized hardware for performing the operations including, for example, one or more arithmetic logic units (ALU's), floating-point units (FPU) and barrel shifters. Data registers 24 are located within the EX stage of pipelines 4 and may directly supply execution unit 25 with locally stored data. In addition, data may be retrieved from data memory 18 based on a memory address generated by DAG 23, or based on an address stored in a pointer register 22, and propagated to the WB stage. During the WB stage, the results of the operation may be written to the destination. The WB stage has two paths for storing the results. Output 26 may be enabled when the results are written to data memory 18 or to data registers 24. Output 27 may be enabled when the results are written to pointer registers 22.

The CC MOVE instruction supported by processor 2 may allow software applications to move data directly between pointer registers 22 and data registers 24. Furthermore, the CC MOVE instruction may allow processors to move the data based on the state of condition flag ($CC_{13}$ FLAG) 29, which is typically set by a previous instruction, such as a compare instruction (CMP), other logical operations or operations that directly set the $CC_{13}$ FLAG 29. $CC_{13}$ FLAG 29 may be stored as a single bit within a storage circuit, such as a status register or flip-flop, and may be set when the CMP instruction, for example, exits the EX stage.

Figure 3:
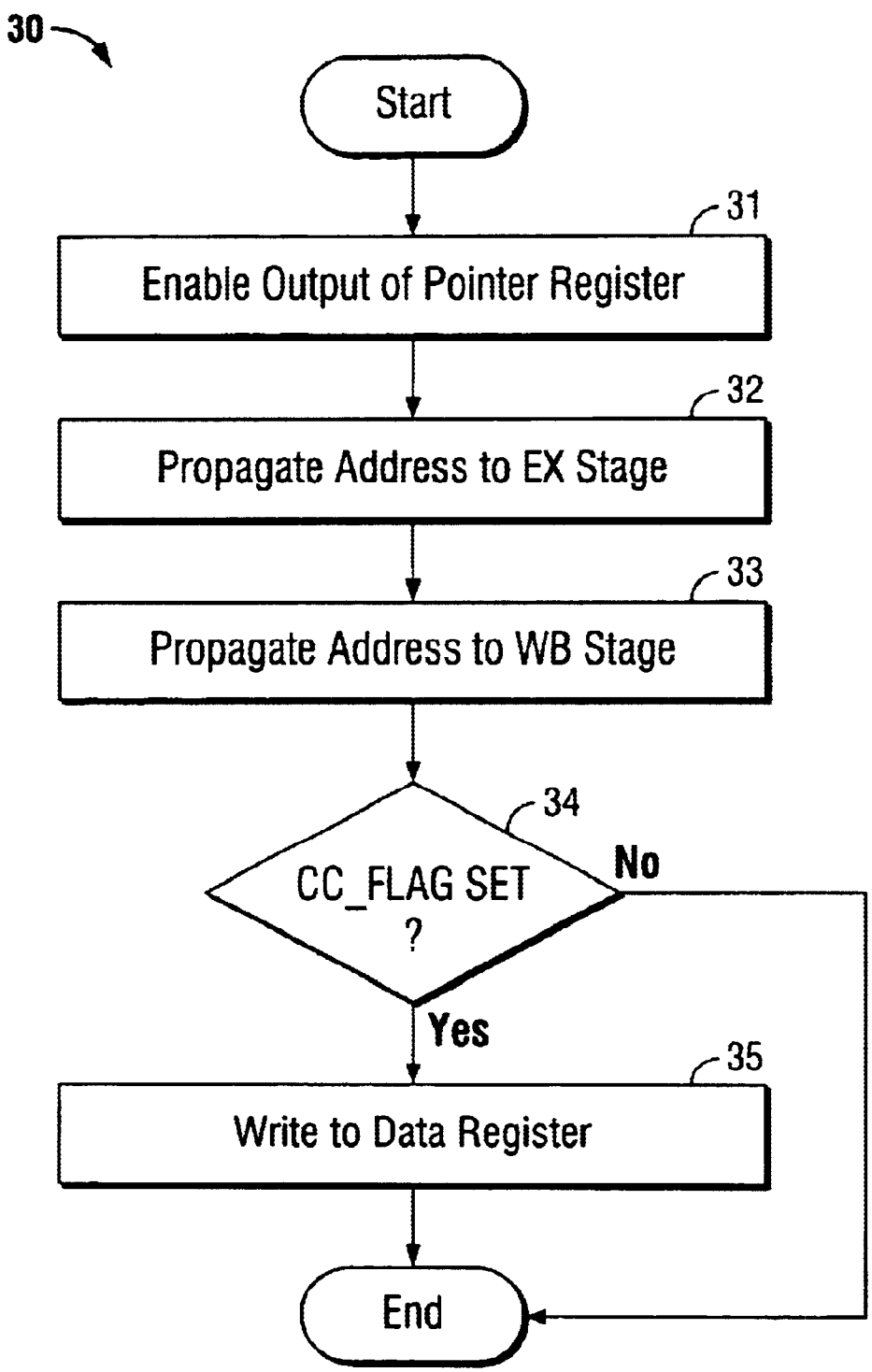
FIGS. 3 and 4 are flowcharts illustrating example implementations of register move instructions according to the invention.

FIG. 3 is a flowchart illustrating an example process 30 by which control unit 6 implements a CC MOVE machine instruction when the source register is a pointer register 22 and the destination register is a data register 24 according to one embodiment. Process 30 is explained with reference to a move instruction that is conditioned upon $CC_{13}$ FLAG 29 being set; however, the move instruction may be conditioned upon $CC_{13}$ FLAG 29 being cleared, although the scope of the present invention is not limited in this respect.

Because $CC_{13}$ FLAG 29 is often set when the prior instruction exits the EX stage, pipelines 4 may partially process the CC MOVE instruction prior to the writing of $CC_{13}$ FLAG. More specifically, when the CC MOVE instruction is in the DEC stage, control unit 6 may speculate that move may occur and enable the output of pointer register 22 and pass the stored address to the AC stage upon the next clock cycle (31).

During the AC stage, control unit 6 may direct DAG 23 to forward the address to the EX stage without modification (32). Alternatively, for pointer registers within DAG 23 (not shown), control unit 6 may enable their output in the AC stage.

During the EX stage, the address may propagate to execution unit 25 via path 15. Control unit may direct execution unit 25 to forward the address to the WB stage without modification (33).

In the WB stage, control unit 6 may determine the state of $CC_{13}$ FLAG 29 within execution unit 25 and decide whether to enable or disable the write to the data registers 24 based on the state. If the $CC_{13}$ FLAG 29 is set, control unit 6 selects the appropriate data register 24 and writes the address via output 26 (34). In this manner, an address may be copied from a pointer register 22 to a data register 24 in response to a CC MOVE instruction. Notably, in order to move data from a pointer register 22 to a data register 24, the address may be propagated across pipelines 4. More specifically, the address may be propagated from a first pipeline, DAG pipeline 12, to a second pipeline, EU pipeline 14, where it may be written to data registers 24 if the condition flag is set. Because pipelines may be physically separated within a processor, there may be delays when propagating data from one pipeline to another. Therefore, the address propagates from the DAG pipeline 12 so the EU pipeline 14 prior to the WB stage in order to reduce the risk that the address is incorrectly written to data register 24.

Figure 4:
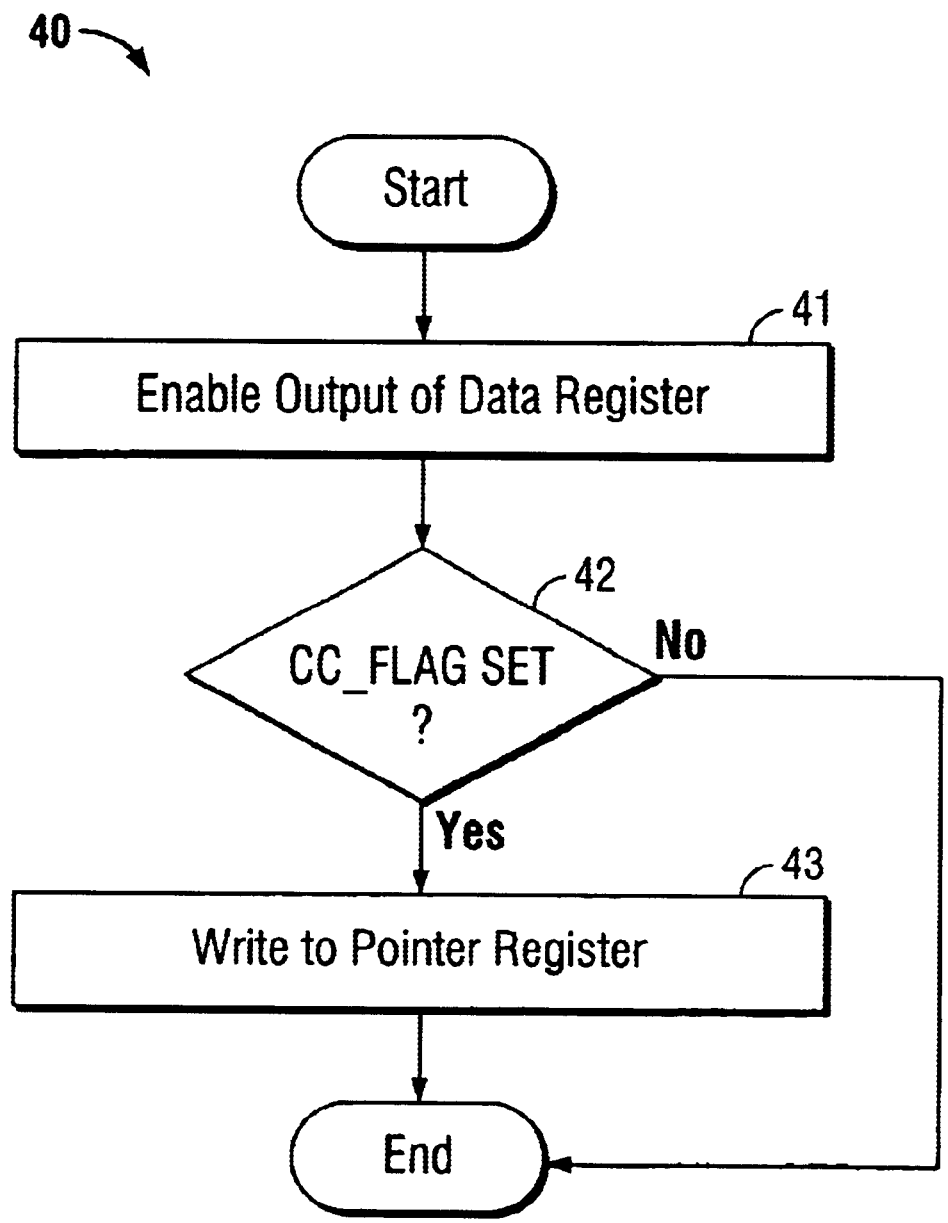

FIG. 4 is a flowchart illustrating an example process 40 by which control unit 6 may implement a CC MOVE machine instruction when the source register is a data register 24 and the destination register is a pointer register 22 according to one embodiment.

During the EX stage, control unit 6 may enable the output of the data register 24, allowing the stored data to propagate from EU pipeline 14 to DAG pipeline 12 via path 19 (41). During the WB stage, control unit 6 may determine the state of $CC_{13}$ FLAG 29 within execution unit 25 of EU pipeline 14 (42). Based on the state of $CC_{13}$ FLAG, control unit 6 may write the data to the appropriate pointer register 22 via output 27 (43). As discussed above, the data may propagate from EU pipeline 14 to DAG pipeline 12 prior to the WB stage in order to allow the address to be written to pointer registers 22. In one embodiment EX stage may include three substages, to provide the data at the WB stage.

The following examples illustrate the syntax for invoking the CC MOVE machine instruction although the scope of the present invention is not limited in this respect:

if CC pl=rl; Move from data register to pointer register if !CC r0=pl; Move from pointer register to data register when CC is false In a typical application, a programmer develops a software application or subroutine that may invoke a register move operation involving both a pointer register and a data register, such as the CC MOVE instruction described above. The programmer may write the software application in assembly language, as illustrated in the example above, or in a high-level software language. A compiler is typically invoked to process the high-level software application and generate the appropriate machine instructions for processor 2, including the CC MOVE machine instruction for conditionally moving data between a pointer register and a data register.

Various embodiments of the invention have been described. For example, a single machine instruction has been described that conditionally moves data between a pointer register and a data register. The processor may be implemented in a variety of systems including general purpose computing systems, digital processing systems, laptop computers, personal digital assistants (PDA's) and cellular phones. In such a system, the processor may be coupled to a memory device, such as a FLASH memory device or a static random access memory (SRAM), that stores an operating system and other software applications.

These and other embodiments are within the scope of the following claims.

What is claimed is:

1. A method comprising:

receiving a machine instruction; and in response to the machine instruction, moving data between a pointer register and a data register based on a state of a condition flag;

wherein the pointer register comprises a portion of a first register tile separate from a second register file comprising the data register, the first register file being used by an address generation unit in generating pointers.

2. The method of claim 1, wherein moving the data includes copying a memory address from the pointer register to the data register.

3. The method of claim 1, wherein moving the data includes copying the data from the data register to the pointer register.

4. The method of claim 1, wherein the pointer register and the data register are located within different stages of different pipelined units of a processor.

5. The method of claim 1 further including selecting a first path when the pointer register is a source for the data and selecting a second path when the data register is the source for the data, and wherein receiving a machine instruction comprises receiving the machine instruction in a digital signal processor comprising the address generation unit.

6. The method of claim 1 further including propagating the data through an execution unit without modification.

7. A method comprising:

receiving a machine instruction;

enabling an output of a pointer register designated by the machine instruction, wherein the pointer register is adapted to store a memory address;

propagating the memory address through an execution unit without modification;

determining a state of a condition flag; and writing the memory address to a data register based on the state.

8. The method of claim 7, further including propagating the address from a first pipeline to a second pipeline.

9. The method of claim 7, further including setting the condition flag during the execution of a previous instruction.

10. A method for moving data in a processor having a plurality of pipelines comprising:

enabling an output of a data register in first pipeline;

propagating data from the data register to a second pipeline prior to a write back stage of the first pipeline; and writing the data to a pointer register located within the second pipeline.

11. The method of claim 10 further including:

determining a state of a condition flag; and writing the data to the pointer register based on the state.

12. The method of claim 10, wherein the pointer register and data register occupy different stages of the first and second pipelines.

13. A method for moving data in a processor having a plurality of pipelines, each pipeline having a write back stage, the method comprising:

enabling an output of a pointer register in first pipeline;

propagating an address from the first pipeline to a second pipeline prior to a write back stage of the first pipeline; and writing the address to a data register located within the second pipeline.

14. The method of claim 13 further including:

determining the state of a condition flag; and writing the data to the pointer register based on the state.

15. The method of claim 13, wherein the pointer register and the data register occupy different stages of the first and second pipelines.

16. The method of claim 13, wherein the pointer register is located in a stage prior to the data register.

17. An apparatus comprising:

an address generation unit comprising a pointer register;

a data register in a register file separate from the pointer register; and a control unit adapted to conditionally move data between the data register and pointer register in response to a single machine instruction.

18. The apparatus of claim 17, wherein the pointer register is located in a first pipeline and the data register is located in a second pipeline.

19. The apparatus of claim 18, wherein the first and second pipeline have a plurality of stages, and further wherein the pointer register and data register are located in different stages of the respective pipeline.

20. The apparatus of claim 18 further comprising a digital signal processor including the address generation unit, the register file, the control unit, and a path coupling the first and second pipelines to communicate an address from the pointer register of the first pipeline to the data register of the second pipeline.

21. The apparatus of claim 18 further comprising a path coupling the first and second pipelines to communicate data from the data register of the second pipeline to the pointer register of the first pipeline.

22. The apparatus of claim 20, wherein each pipeline includes a write back stage, and further wherein the path communicates the address to the second pipeline prior to the write back stage.

23. The apparatus of claim 21, wherein each pipeline includes a write back stage, and further wherein the path communicates the data to the first pipeline prior to the write back stage.

24. The apparatus of claim 17 further including an execution unit adapted to propagate the data from the pointer register to the write back stage without modification.

25. An article comprising a medium having computer-executable instructions stored thereon for compiling a software program, wherein the computer-executable instructions are adapted to generate a single machine instruction to cause a programmable processor to conditionally move data between a pointer register and a data register, wherein the instruction causes the programmable processor to forward the data between a data address generation pipeline and an execution unit pipeline.

26. The article of claim 25, wherein the instruction causes the programmable processor to move the data from the data register to the pointer register.

27. The article of claim 25, wherein the processor comprises a digital signal processor and the machine instruction causes the processor to select a first path when the pointer register is a source for the data and a second path when the data register is a source for the data.

28. A system comprising:

a memory device; and a digital signal processor coupled to the memory device, wherein the processor includes an address generation unit that uses a register file including a pointer register in generating pointers, a data register separate from the register file, and a control unit adapted to conditionally move data between the data register and pointer register in response to a single machine instruction.

29. The system of claim 28, wherein the pointer register is located in a first pipeline and the data register is located in a second pipeline.

30. The system of claim 29, wherein the first and second pipeline have a plurality of stages, and further wherein the pointer register and data register are located in different stages of the respective pipeline.

31. The system of claim 29 further comprising a path coupling the first and second pipelines to communicate an address from the pointer register of the first pipeline to the data register of the second pipeline.

32. The system of claim 29 further comprising a path coupling the first and second pipelines to communicate data from the data register of the second pipeline to the pointer register of the first pipeline.

33. The system of claim 31, wherein each pipeline includes a write back stage, and further wherein the path communicates the address to the second pipeline prior to the write back stage.

34. The system of claim 32, wherein each pipeline includes a write back stage, and further wherein the path communicates the data to the first pipeline prior to the write back stage.

35. The system of claim 28 further including an execution unit adapted to propagate the data from the pointer register to the write back stage without modification.

36. The system of claim 28, wherein the memory device comprises static random access memory.

37. The system of claim 28, wherein the memory device comprises FLASH memory.

* * * * *